(12) United States Patent
Steigerwald et al.

(10) Patent No.: US 7,857,319 B2
(45) Date of Patent: Dec. 28, 2010

(54) MECHANICAL SEAL WITH BANDED RING

(75) Inventors: Thomas Steigerwald, Chicago, IL (US); Michael Kalodimos, Morton Grove, IL (US); Douglas Volden, Park Ridge, IL (US)

(73) Assignee: John Crane Inc., Morton Grove, IL (US)

( * ) Notice: Subject to any disclaimer, the term of this patent is extended or adjusted under 35 U.S.C. 154(b) by 751 days.

(21) Appl. No.: 11/759,043

(22) Filed: Jun. 6, 2007

(65) Prior Publication Data

US 2007/0284830 A1      Dec. 13, 2007

Related U.S. Application Data

(60) Provisional application No. 60/811,986, filed on Jun. 8, 2006.

(51) Int. Cl.
*F16J 15/34* (2006.01)
(52) U.S. Cl. .................................. 277/359; 277/360
(58) Field of Classification Search ................ 277/373, 277/372, 390, 360, 359
See application file for complete search history.

(56) References Cited

U.S. PATENT DOCUMENTS

| | | | |
|---|---|---|---|
| 2,247,505 A | 1/1939 | Kohler | |
| 2,311,557 A * | 2/1943 | Mason | 277/484 |
| 2,574,808 A | 11/1951 | Wolfe | |
| 2,828,983 A | 4/1958 | Hunt | |
| 2,937,039 A | 5/1960 | Santapa | |
| 3,276,780 A | 10/1966 | Andresen | |
| 3,372,939 A | 3/1968 | Coulombe et al. | |
| 3,416,808 A | 12/1968 | Voitik | |
| 3,515,394 A | 6/1970 | Stevens | |
| 3,582,089 A | 6/1971 | Amorese | |
| 3,915,459 A | 10/1975 | Kunderman | |
| 4,163,563 A | 8/1979 | Mullaney | |
| 4,217,766 A | 8/1980 | Suckow | |
| 4,365,816 A | 12/1982 | Johnson | |
| 4,434,986 A | 3/1984 | Warner | |
| 4,509,762 A | 4/1985 | Garrett | |
| 4,586,719 A | 5/1986 | Marsi | |
| 4,700,953 A | 10/1987 | Kuusela et al. | |

(Continued)

FOREIGN PATENT DOCUMENTS

FR      2 787 851      6/2000

(Continued)

OTHER PUBLICATIONS

Form PCT/ISA/210, International Search Report, International Application No. PCT/US2007/070640.

(Continued)

*Primary Examiner*—Shane Bomar
*Assistant Examiner*—Michael Wills, III
(74) *Attorney, Agent, or Firm*—Leydig, Voit & Mayer, Ltd.

(57) ABSTRACT

A mechanical end face seal with a pair of annular relatively rotating seal face defining seal rings. An annular compression contact ring disposed in surrounding relation to one of the seal rings includes a plurality of pads at asymmetrical locations in interference contact with the outer cylindrical surface of the ring.

14 Claims, 4 Drawing Sheets

U.S. PATENT DOCUMENTS

| | | |
|---|---|---|
| 4,890,851 A | 1/1990 | Avard |
| 4,971,337 A | 11/1990 | Hufford |
| 5,026,077 A | 6/1991 | Warner |
| 5,078,510 A | 1/1992 | Bair |
| 5,188,377 A | 2/1993 | Drumm |
| 5,332,361 A | 7/1994 | Bras |
| 5,344,164 A | 9/1994 | Carmody |
| 5,445,574 A | 8/1995 | Sekiguchi |
| 5,538,649 A | 7/1996 | Demendi et al. |
| 5,613,781 A | 3/1997 | Kuzdzal et al. |
| 5,738,356 A | 4/1998 | Marshall |
| 5,758,880 A | 6/1998 | Ice |
| 5,957,461 A | 9/1999 | Ulrich |
| 6,536,953 B1 | 3/2003 | Cope |
| 6,550,779 B2 | 4/2003 | Bjornson |
| 6,561,515 B1 | 5/2003 | Bjornson |
| 6,616,337 B1 | 9/2003 | Smith |
| 6,758,476 B2 | 7/2004 | Takahashi |
| 6,814,355 B2 | 11/2004 | Bjornson |
| 6,935,771 B2 | 8/2005 | Engel |
| 7,051,346 B2 | 5/2006 | Masaki |

FOREIGN PATENT DOCUMENTS

| | | |
|---|---|---|
| JP | 2005207520 | 4/2005 |

OTHER PUBLICATIONS

Form PCT/ISA/237, Written Opinion of the International Searching Authority, International Application No. PCT/US2007/070640.

* cited by examiner

Flexural Vibration in
Plane of Ring

Torsional

Extensional

MECHANICAL SEAL WITH BANDED RING

CROSS-REFERENCE TO RELATED APPLICATIONS

This patent application claims the benefit of U.S. Provisional Patent Application No. 60/811,986, filed Jun. 8, 2006, which is incorporated by reference.

BACKGROUND OF THE INVENTION

This invention relates to mechanical end face seals. More particularly, it relates to an arrangement for noise attenuation in such seals.

Mechanical end face seals are employed in a wide variety of industrial applications such as liquid pumps, mixing vessels and the like to provide a fluid tight seal between a housing and a rotatable shaft. Such seals include an annular stationary ring associated with the housing and an annular rotatable ring associated with the shaft which includes sealing faces in a relatively rotating sealing relation along a seal interface. In pumps, the seal interface is lubricated by the fluid to be sealed, or a separate barrier fluid introduced into the seal chamber.

In mixers and agitator applications, the seals are employed to contain the product being mixed, usually by a vertically rotating agitator within a vessel. These seals, typically mounted near the top of the vessel are dry running, in that they operate in the vapor of the product mix or a gaseous atmosphere such as an air or nitrogen barrier fluid.

Dry running contacting face seals are commonly used to seal rotating shafts on mixers and agitators found throughout the chemical and pharmaceutical processing industries. A continuing problem experienced with dry running contacting seal faces, is that over time they develop an audible high pitched squeal or intermittent squeak. Many chemical and especially pharmaceutical production lines are located within enclosed buildings where the seal face noise creates an unpleasant and deleterious working environment.

Cause of the squealing phenomenon is generally thought to be related to harmonic vibration generated as a result of the rubbing characteristics of the seal face material properties, seal ring structure and equipment operational influences. The most common experience is on top entering mixers where the seal is mounted on the shaft that extends vertically down through the vessel flange opening. The seal head generally rotates with the shaft and the stationary face or mating ring is mounted against the vessel flange. The seal runs dry as the vessel normally has a vapor zone at the top of the product chamber. Most common seal designs for such applications are O-ring pusher seals with multiple springs and axial drive pins or lugs.

Seal face material selection is quite narrow being limited to those materials uniquely capable of providing suitable wear and sealing performance under various dry running application conditions. Select specialty carbon grade seal faces are typically utilized running against either a tungsten or silicon carbide counter face.

Several attempts to attenuate the squealing have been made that have not been successful. These fall into basic categories; materials and damping. Material changes are very limited due to the primary dry running function that must be maintained. To date, acceptable dry running face materials all still appear to exhibit squealing in operation.

Vibration damping methods have been applied to both the mating ring and the primary ring. One unsuccessful attempt at eliminating the noise was to place a shock absorbent pad behind the mating ring in order to reduce vibration. There have also been attempts to deaden the carbon primary ring by pressing a solid stainless steel ring on the outer diameter. This also has been proven to be ineffective in preventing faces from squealing.

Previously, noise attenuation efforts were limited to additions to the seal face that added mass, or changes to the seal face material to add mass or change the rate of wear or damping. Also, some effort had been made in the past to control the atmosphere surrounding the seal i.e., humidifying barrier gas or changing barrier pressure.

This invention seeks to address the distortion effects that stresses have on the seal face and how those stresses affect rubbing characteristics that create noise generation.

It is believed that as the relatively rotating seal faces run in, which occurs quite quickly on dry running contacting faces, the surfaces self-polish, creating an interface environment that is devoid of lubrication and is the mechanism that sets up vibration harmonics that result in the audible squealing. It is believed that by imparting some waviness to the seal face, it will prevent the high self-polishing action and permit an adequate level of lubrication to exist between the seal faces sufficient to prevent the onset of vibration induced squealing.

The present invention embodies a metal ring pressed on an outer diameter of the carbon ring near the sealing face that has intermittent sections on the ring inside diameter contacting the carbon with an interference fit at a number of designated asymmetrically located positions. This ring design imparts stresses on the carbon which, in turn, result in slight deformations on the seal face. The stress ring exerts circumferential pressure on the primary seal face which is unequal, and thus is ever changing depending upon the rotational speed of the shaft and axial load exerted on the seal. Thermal changes at the seal faces also affect the changes in stress. The changing state of stress on the primary ring serves to interrupt harmonic vibration at the seal faces and thus results in quiet dry running operation.

The arrangement of the present invention imparts radial pressure at locations around the outer surface of one seal ring at unequal or asymmetrical locations. The asymmetrical placement serves to interrupt the natural harmonics of resonance of the primary ring. A stress band or compression ring surrounds an outer cylindrical surface of one of the seal rings near the radially directed annular seal face. The band includes a plurality of radially inwardly directed pads disposed asymmetrically about the ring circumference. These pads are in interference fitting contact with the outer cylindrical surface of the seal ring. It imparts radially inward compressive forces to the annular seal ring. The resultant stresses distort the generally planar annular seal face.

The radial forces imparted to the seal ring face create distortion along the generally planar seal face. It is contemplated that such distortion or waviness may also be useful in liquid seals. It is contemplated that such a relationship between the seal faces in liquid pump applications may improve lubrication capabilities by the barrier liquid or process fluid leading to enhanced seal durability. This invention therefore also has application to liquid seals.

DETAILED DESCRIPTION OF THE INVENTION

Figure 1:
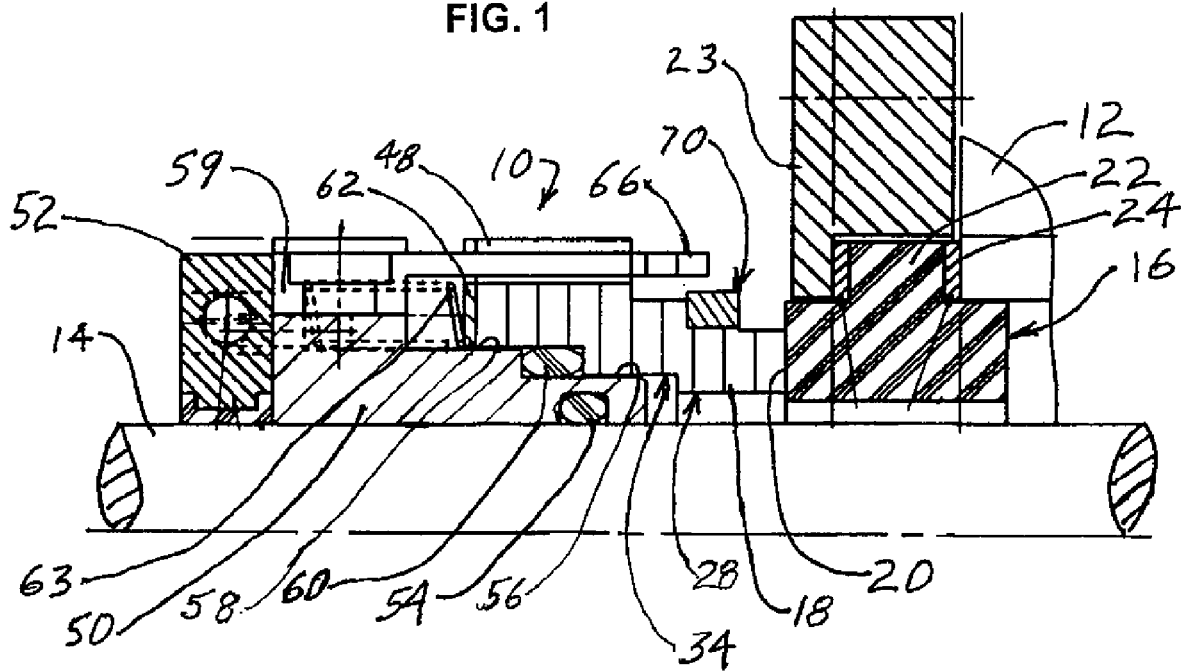
FIG. 1 is a sectional side view of a seal assembly installed between a housing and a shaft and embodying the present invention.
Figure 2:
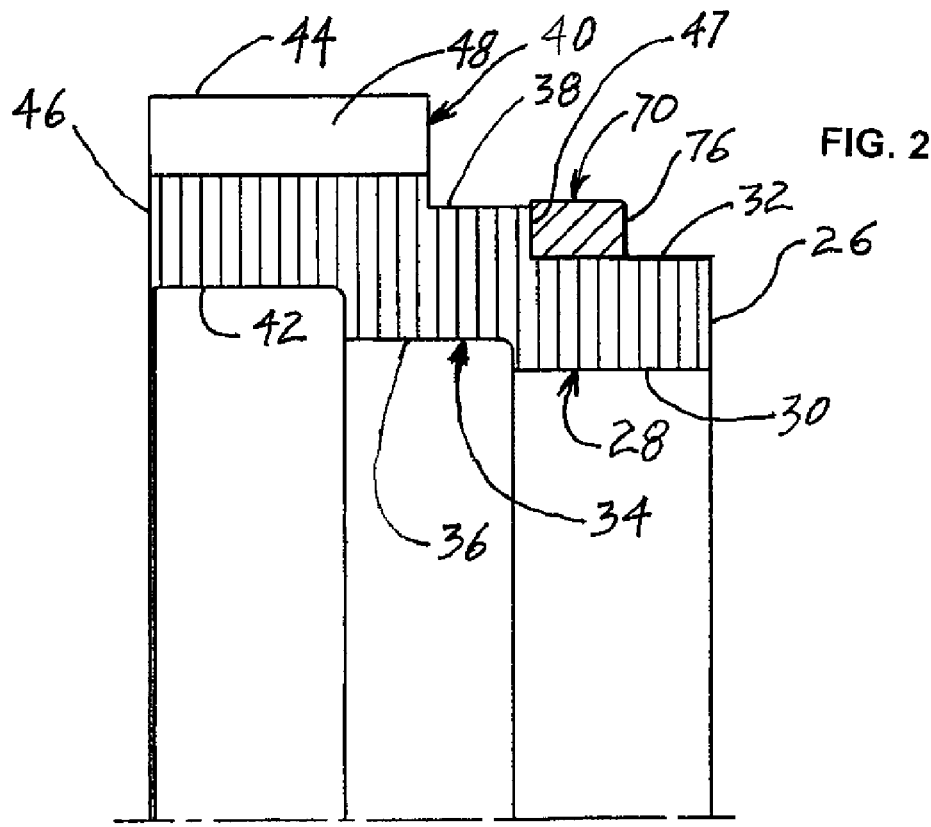
FIG. 2 is a sectional side view of the primary ring of the seal assembly of FIG. 1 illustrating the contact ring or stress band surrounding an outer cylindrical surface near the annular radial seal face.

Turning now to the drawings, FIGS. 1-6 illustrate a seal assembly generally designated 10 embodying the principles of the present invention. The seal assembly 10 is arranged in fluid tight sealing relation between a housing 12 and a relatively rotating shaft 14. It includes an annular stationary seal ring 16 associated with the housing 12 and annular axially moveable primary ring 18 associated with the shaft. In the embodiment illustrated the housing 12 may be a mixing vessel or the like and the shaft 14 a part of a rotatable mixing agitator (not shown). The shaft 14 would in this application be vertically oriented. The seal may operate in the vapor of the product being mixed, or an atmospheric or gaseous barrier may be introduced to the seal area. Also, the seal may be run outside the vessel in the atmosphere.

It is contemplated that the present invention has application to liquid pump seals as well as dry running seals. In such an application, the housing 12 would comprise a pump housing that includes a seal cavity and the shaft 14 which would include a pump impeller (not shown). The shaft would usually be horizontally oriented, though orientation of the shaft is not material to the invention.

The mating ring 16 is annular and surrounds shaft 14. It defines a radially directed generally planar sealing face 20. The ring 16 is made from any suitable material such as tungsten carbide or silicon carbide. It includes an annular radial extension portion 22. A gland plate 23 clamps the extension 22 to the housing 12. A pair of annular gaskets 24 provide a fluid tight seal between the seal ring extension 22 and the housing components 12 and 24.

Primary seal ring 18 is axially moveable and rotatable with shaft 16. It is annular and surrounds shaft 16. It defines a radially directed annular sealing face 26. The sealing face 26 is formed on a front, or nose portion 28 of primary seal ring 18. Nose portion 28 includes radially inner cylindrical surface 30 surrounding shaft 14 and radially outer cylindrical surface 32.

Primary ring 18 includes middle body portion 34 defined by radially inner cylindrical surface 36 and radially outer cylindrical surface 38. Radial annular abutment surface 47 extends between outer cylindrical surface 32 of front or nose portion 28 and outer cylindrical surface 38 of middle body portion 34.

Figure 3:
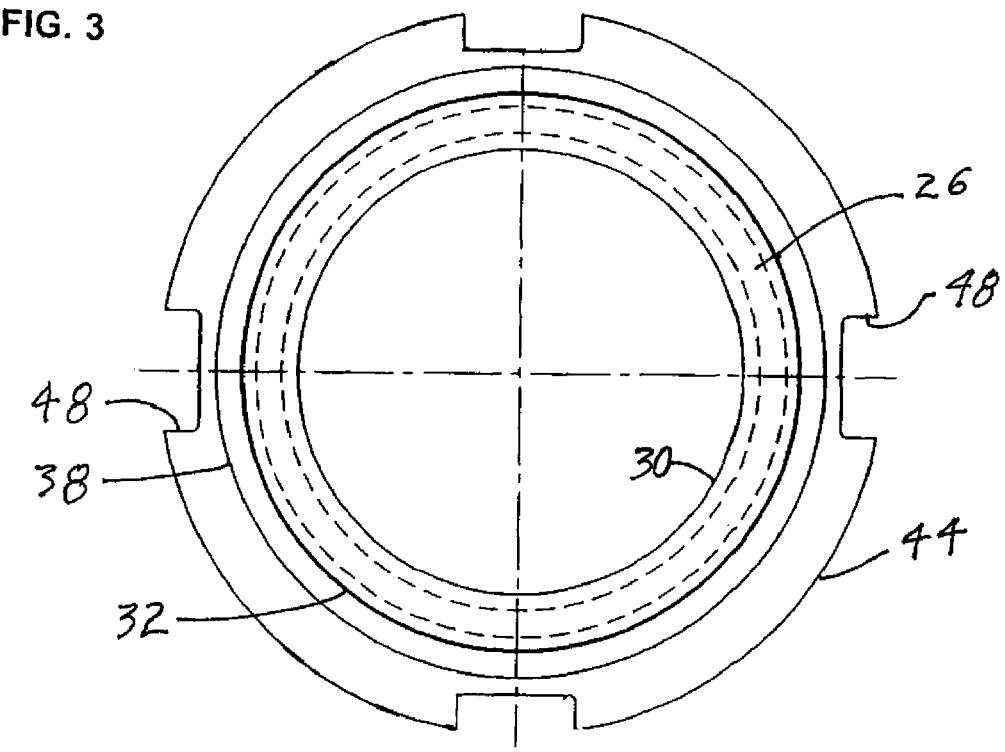
FIG. 3 is a front view of the primary ring of the seal assembly of FIG. 1.

The primary ring 18 also includes a rear body portion 40 defined by radially inner cylindrical surface 42 and radially outer cylindrical surface 44. A radial annular rear face 46 extends between the radially inner and radially outer cylindrical surface 42 and 44. Rear body portion 40 includes a series of notches 48 radially inward of outer cylindrical surface 44 as best seen in FIG. 3.

Primary ring 18 of the illustrated embodiment may be carbon or carbon composite ring. As illustrated, primary ring 18 is comprised of three stepped portions, a nose or front portion 28, a middle portion 34 defined by somewhat larger diameter cylindrical surfaces 36 and 38 and a rear portion 40 defined by somewhat larger diameter cylindrical surfaces 42 and 44. It is exemplary of a seal assembly embodiment that benefits from the present invention. The particular shape of the primary ring is not critical, and it may have any other shape suitable for response to the application of the interference fit compression ring or stress band arrangement.

Primary ring 18 is supported on shaft 14 by annular carrier or sleeve 50. A ring 52 is secured to shaft 14. Carrier 50 is, in turn, secured to ring 52. An O-ring 54 provides a fluid tight seal between shaft 14 and sleeve 50.

A forward, outer cylindrical surface 56 is sized to slidably receive radially inner cylindrical surface 36 of middle body portion 34 of primary seal ring. Rearward, outer cylindrical surface 58 of sleeve 50 slidably receives radially inner cylindrical surface 42 of rear body portion of primary ring 18. A secondary seal in the form of O-ring 60 provides a fluid tight seal between the primary seal ring 18 and the sleeve 50 and permits axial movement of the primary ring 18 relative to sleeve 50.

Carrier 50 includes a radial flange 59 that includes a series of spring pockets around the flange. A spring disc 62 is positioned adjacent rear face 46 of primary ring 18. A plurality of compression coil springs 63 are disposed about the carrier 50 between the carrier and the spring disc 62. They bias the primary ring 18 toward the mating ring 16 and maintain the seal faces 20 and 26 in fluid tight sealing relation.

A lug 66 fastened to the flange 59 of sleeve 50 extends into each notch 48 in primary ring 14 to provide a positive driving relation between rotating carrier 50 and primary ring 18.

Figure 4:
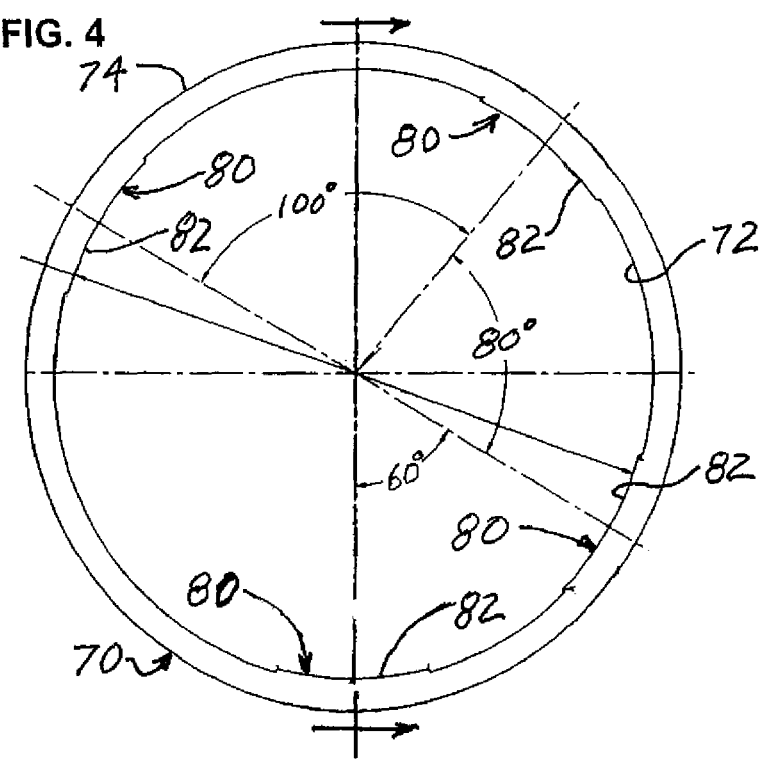
FIG. 4 is a front view of the compression contact ring or stress band of the seal assembly of FIG. 1.
Figure 5:
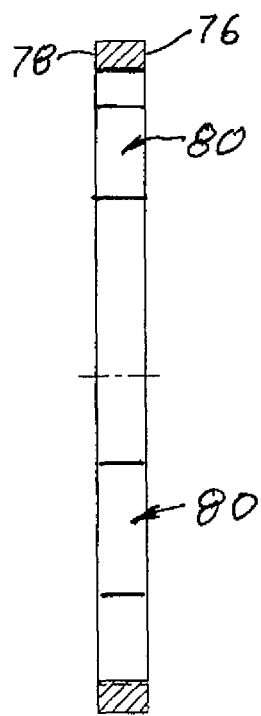
FIG. 5 is a side view, in section, of the compression contact ring of FIG. 4.
Figure 6:
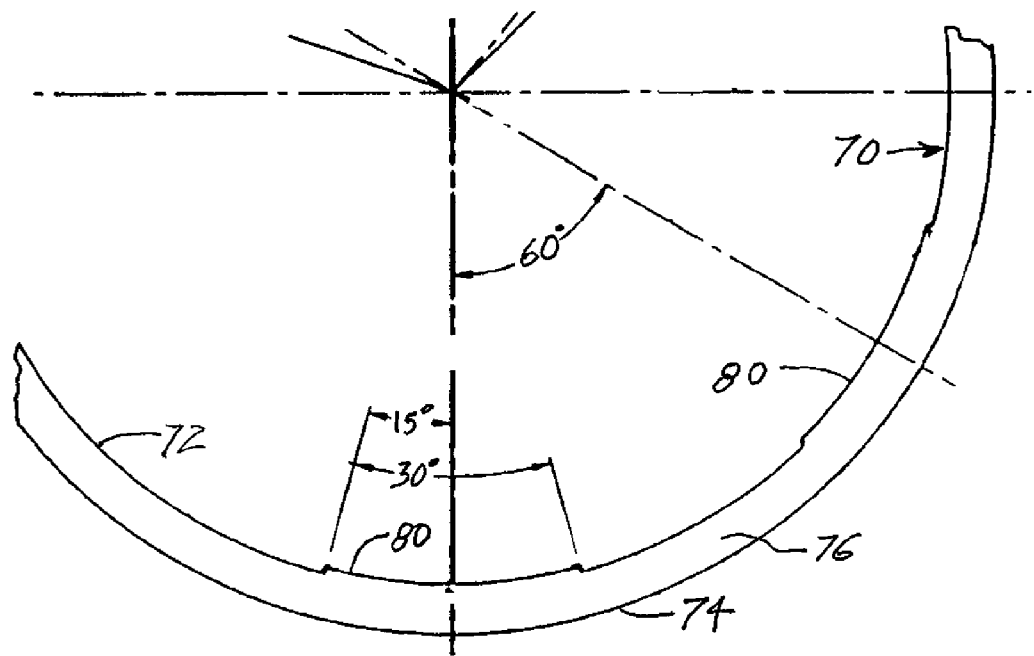
FIG. 6 is a fragmentary front view of the compression contact ring of FIG. 4.

In accordance with the present invention, compression contact ring or stress band 70 surrounds nose portion 28 of primary ring 18. It resides on outer cylindrical surface 32 of nose portion 28 and abuts radial annular surface 47. The compression contact ring 70 is best seen in FIGS. 4, 5 and 6. It is annular and is preferably made of steel, or stainless steel depending upon the operating environment of application of the seal assembly.

Ring 70 includes a radially inner cylindrical surface 72 and a radially outer cylindrical surface 74 both of which are larger in diameter than the radially outer cylindrical surface 32 of the nose portion 28 of primary ring 18. It extends axially between an annular forward face 76 and rearward face 78. Its axial length is less than the axial length of the radially outer cylindrical surface 32 that defines the axial length of nose portion 28.

The radially inner cylindrical surface 72 of compression contact ring 70 includes a plurality of radially inwardly directed segments or contact pads 80 spaced about the inner cylindrical surface 72 of compression contact ring 70. In this embodiment of the invention segments 80 are integrally formed with ring 70.

Pads 80 include inner arcuate contact surfaces 82 that are in an interference fit upon radially outer cylindrical surface 32 of nose portion 28 of seal ring 18. That is, the contact surfaces 82 are formed upon a diameter that is smaller than the diameter of radially outer cylindrical surface 32 of seal ring 18. The amount of interference fit is that which is sufficient to provide the requisite loading to the nose portion 28 of seal ring 18 to create distortion in otherwise planar seal face 26. In one example, the diameter of the radially outer cylindrical surface 32 was 2.515 inches±0.001 inch. The diameter of the circle defined by the arcuate surfaces 82 of the segments 80 was 2.507 inches±0.001. Such an arrangement was found to be effective in operational testing.

Pads 80 are asymmetrically disposed about the inner cylindrical surface 72 of contact compression ring 70. Referring to FIG. 4, a pattern of such asymmetrical distribution is illustrated. Four pads 80 are shown, each bisected by a radial centerline. The inner arcuate contact surfaces extend approximately fifteen degrees (15°) on either side of the pad centerline thus occupying thirty degrees (30°) of circumference.

In FIG. 4, a first pad 80 is illustrated at the six o'clock position with its centerline positioned vertically. A second pad 80 is located with its centerline sixty degrees (60°) from the centerline of the first pad in the counterclockwise direction. A third pad 80 is located with its centerline eighty degrees (80°) from the centerline of the second pad in the counterclockwise direction and a fourth pad 80 is located with its centerline one hundred degrees (100°) from the centerline of the third pad in the counterclockwise direction. It should be noted that the orientation shown is merely illustrative. The pad 80 with its centerline vertically disposed could be in contact with the radially outer cylindrical surface 32 of a primary ring 18 at any position about its circumference. The circumferential disposition of the other pads 80 relative to the radially outer cylindrical surface 32 would change accordingly.

It must be understood that the arrangement illustrated is exemplary of a representative pattern of a distribution about the compression contact ring contemplated by the invention. There could be more than four pads, or less. The angular distribution between pads could also be different than that illustrated.

Figure 7:
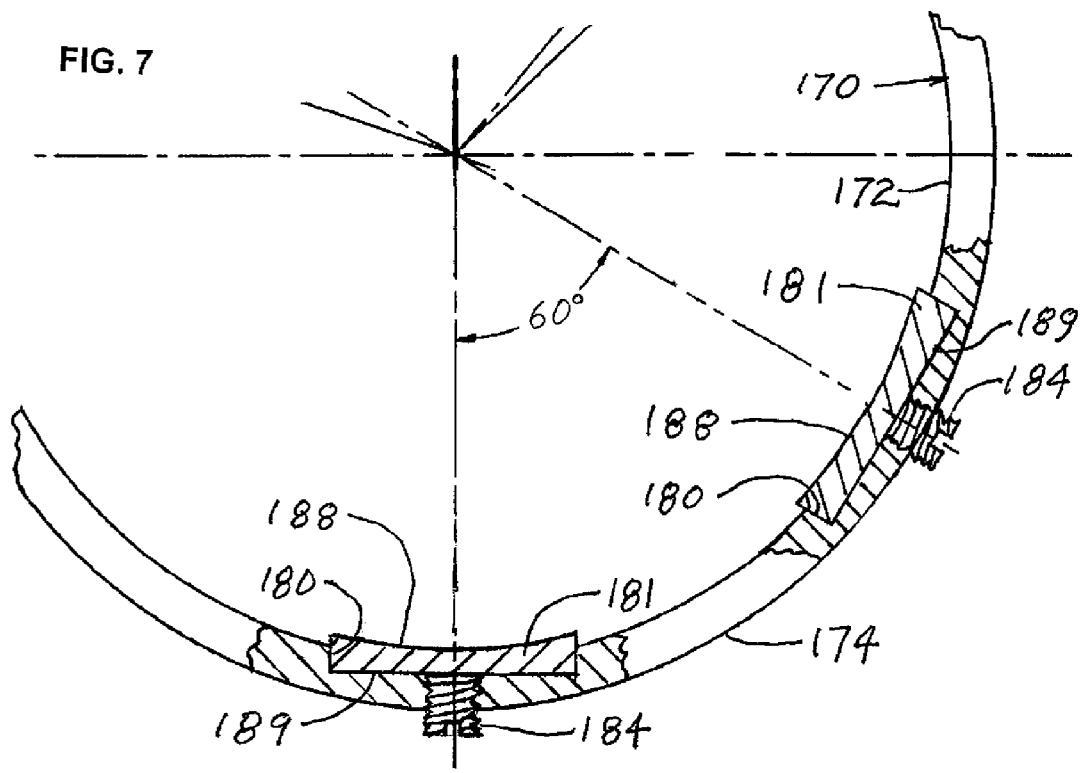
FIG. 7 is a fragmentary front view of a compression contact ring or stress band illustrating a modified form of the invention.
Figure 8A:
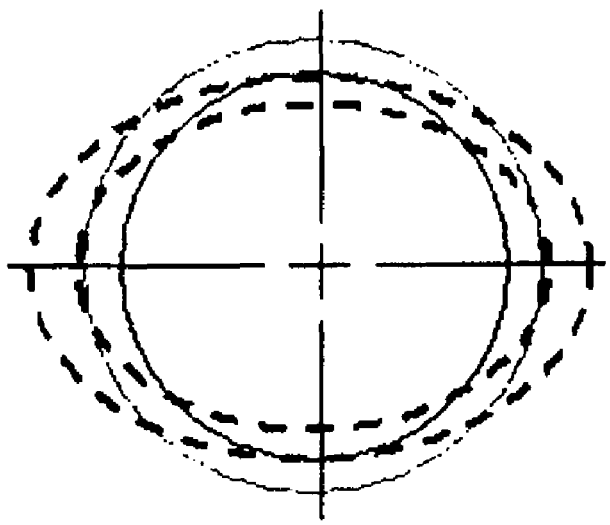
FIGS. 8a-c illustrate the vibration characteristics of a ring, respectively in flexural vibration relative to the plane of the ring, torsional vibration about the centroid of the ring cross section and extensional or radial vibration as described in "Shock and Vibration Handbook" Second Edition, edited by Cyril M. Harris and Charles E. Crede, copyright 1976.
Figure 8B:
Figure 8C:
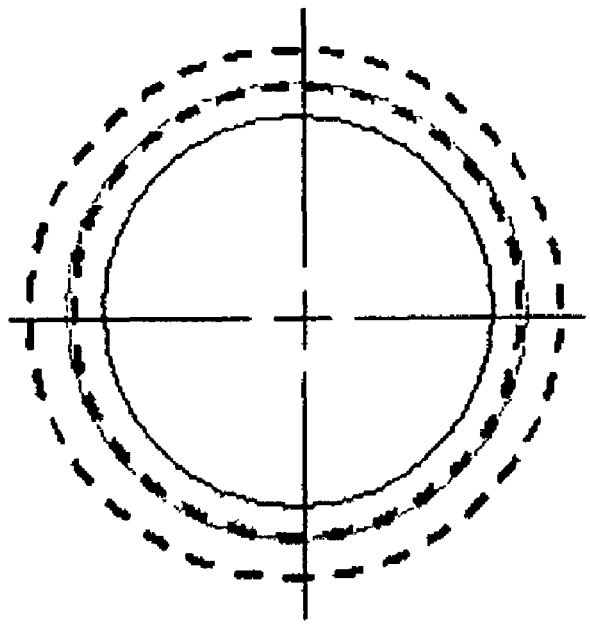

Turning now to FIG. 7, there is illustrated an alternate form of compression ring or stress band 170. It compresses an annular ring having an inner cylindrical surface 172 and an outer cylindrical surface 174 larger than the diameter of outer cylindrical surface 32 of nose portion 28 of primary ring 18. Thus, inner cylindrical surface 172 is cylindrical and thus is completely spaced from surface 32 of primary ring 18 when overlying that ring surface.

Band 170 includes a plurality of pockets 180 positioned in asymmetrical locations about inner cylindrical surface 172 in a pattern similar to the asymmetrical patterns previously discussed with respect to compression ring 70 of FIGS. 1-6. The pockets 180 are bisected by radial centerlines. Only two pockets are illustrated in FIG. 7, however, it is understood that there are four pockets with angular spacing between centerlines the same as illustrated with regard to the band 70 in FIGS. 4 and 6.

The ring 170 includes a threaded hole associated with each pocket in which is located a set screw 184. Each pocket 180 houses an insert 181 having side walls guided in pockets 180 and a radially outer wall 189 facing set screw 184. Radially inner surface of each insert defines an arcuate surface 188 formed on a diameter somewhat smaller than the diameter of the outer cylindrical surface 32 of nose portion 28 of primary ring 18 as described with respect to the segments 80 of the embodiment of FIGS. 1-6.

The stress band 170 is installed on a seal ring as in the embodiment of FIGS. 1-6. That is, the annular ring 170 is positioned in overlying relation to the radially outer cylindrical surface 32 of the primary ring 32 near the annular seal face 26. Set screws 184 are used to move the arcuate surfaces 188 into compressive contact with the outer cylindrical surface 32 to impart compressive stress and introduce distortion into the otherwise planar sealing face 28 of primary ring 18. These set screws can be adjusted, as desired, to maximize the effectiveness of the distortion.

The terms "comprising," "having," "including," and "containing" are to be construed as open-ended terms (i.e., meaning "including, but not limited to,"). The use of any and all examples, or exemplary language (e.g., "such as") provided herein, is intended merely to better illuminate the invention and does not pose a limitation on the scope of the invention. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Any combination of the above-described elements in all possible variations thereof is encompassed by the invention.

The invention claimed is:

1. A mechanical end face seal assembly to provide a fluid tight seal between a housing and a relatively rotatable shaft comprising:
   a pair of annular seal rings surrounding the shaft each including an annular generally planar sealing face disposed in fluid tight sealing relation to the annular generally planar sealing face of the other of said rings,
   one of said rings being associated with the housing in fluid tight sealing relation, the other of said rings being associated with said shaft in fluid tight relation, one of said rings being axially moveable and biased toward the other of said rings,
   said axially moveable ring including a radially outer cylindrical surface, and
   a compression contact ring surrounding said radially outer cylindrical surface having a plurality of arcuate contact surfaces in compressive contact with said radially outer cylindrical surface of said axially moveable seal ring at asymmetrical locations about said seal ring.

2. A mechanical end face seal as claimed in claim 1 wherein said compression contact ring includes an inner cylindrical surface having a diameter larger than the radially outer cylindrical surface of said axially moveable ring, and further includes a plurality of radially inwardly directed pads asymmetrically spaced about said inner cylindrical surface of said compression contact ring each said pad having an inner arcuate contact surface in arcuate compressive contact with said radially outer cylindrical surface of said axially moveable seal ring.

3. A mechanical end face seal assembly as claimed in claim 2 wherein said arcuate surfaces are formed on a diameter that is smaller than the radially outer cylindrical surface of said axially moveable seal ring and wherein each said pad is bisected by a radial centerline and said inner arcuate contact surface of said pad extends for at least fifteen degrees (15°) on either side of said centerline.

4. A mechanical end face seal as claimed in claim 3 wherein the centerlines of at least two such pads are disposed about sixty degrees (60°) apart.

5. A mechanical end face seal as claimed in claim 3 wherein the centerlines of at least two such pads are disposed about eighty degrees (80°) apart.

6. A mechanical end face seal as claimed in claim 3 wherein the centerlines of at least two such pads are disposed about one hundred degrees (100°) apart.

7. A mechanical end face seal as claimed in claim 2 wherein said compression contact ring includes at least four such pads, and each such pad is bisected by a radial centerline and the centerlines of each such pad are disposed at different angular distances from adjacent pads.

8. A mechanical end face seal as claimed in claim 3 wherein said compression contact ring includes at least four such pads wherein each such pad is bisected by a radial centerline and the centerlines of each such pad are disposed at different angular distances from adjacent pads.

9. A mechanical end face seal as claimed in any one of claims 1 to 8 wherein said axially moveable seal ring includes radially directed annular abutment surface and said compression contact ring includes an annular face in abutting contact therewith.

10. A mechanical end face seal as claimed in claim 9 wherein said compression contact ring has an axial length that is less than the distance between said radially directed annular abutment surface and said generally planar annular sealing face of said axially moveable ring.

11. A mechanical end face seal as claimed in claim 2 wherein said pads comprise separate inserts, slidably received in said ring and adjustable relative thereto.

12. A mechanical end face seal as claimed in claim 11 wherein said compression contact ring includes a plurality of asymmetrically disposed pockets and said inserts are disposed in said pockets.

13. A mechanical end face seal as claimed in claim 12 wherein a set screw is supported at each said pocket by said compression ring and said set screws are adjustable relative to said ring to adjust said inserts.

14. A mechanical end face seal assembly as claimed in claim 11 wherein said each insert includes an arcuate contact surface in compressive contact with said radially outer cylindrical surface of said axially moveable seal ring, said arcuate surfaces are formed on a diameter that is smaller than the radially outer cylindrical surface of said axially moveable seal ring.

* * * * *